United States Patent [19]

Sivers et al.

[11] 4,273,207
[45] Jun. 16, 1981

[54] SUPPORTING PIPE TO CONSTITUTE A DRIVE UNIT FOR AN AUTOMOTIVE VEHICLE

[75] Inventors: Rolf V. Sivers, Warmbronn; Rudolf Herrmann, Flein; Ulrich Layher, Sersheim, all of Fed. Rep. of Germany

[73] Assignee: Dr. Ing. h.c.F. Porsche Aktiengesellschaft, Stuttgart, Fed. Rep. of Germany

[21] Appl. No.: 72,608

[22] Filed: Sep. 5, 1979

[30] Foreign Application Priority Data

Sep. 5, 1978 [DE] Fed. Rep. of Germany ....... 2838574

[51] Int. Cl.³ ............................................. B60K 17/22
[52] U.S. Cl. .................................. 180/70 P; 138/149; 181/207; 181/227
[58] Field of Search .......................... 180/70 P, 70 R; 181/207, 211, 227, 243; 285/55; 138/109, 110, 143, 149

[56] References Cited

U.S. PATENT DOCUMENTS

| 2,001,167 | 5/1935 | Swennes | 181/207 |
| 3,133,612 | 5/1964 | Sailler | 181/227 |
| 3,292,389 | 12/1966 | Adloff et al. | 180/70 P |
| 3,835,892 | 9/1974 | Keller | 181/227 |
| 3,921,673 | 11/1975 | Pero | 285/55 |
| 3,998,290 | 12/1976 | Sivers et al. | 180/70 P |

Primary Examiner—John P. Silverstrim
Assistant Examiner—Donn McGiehan
Attorney, Agent, or Firm—Craig and Antonelli

[57] ABSTRACT

An engine-transmission assembly wherein the engine in it is connected to a rear transmission unit by a supporting pipe which serves to reduce vibration and noise. According to preferred embodiments of the invention, the supporting pipe includes at least one outer pipe and an inner pipe fitted therein which are interconnected at only ends and are held in position via a friction seat. The pipes forming the supporting pipe can be of equal length and thickness or can be of varying length and/or thicknesses according to other embodiments.

22 Claims, 6 Drawing Figures

SUPPORTING PIPE TO CONSTITUTE A DRIVE UNIT FOR AN AUTOMOTIVE VEHICLE

BACKGROUND AND SUMMARY OF THE INVENTION

The invention relates to a supporting pipe for constituting a drive unit for an automotive vehicle, comprising an engine with clutch and transmission unit, whereby the engine is disposed at the front and the transmission in the rear, connected as a unit with interposition of the supporting pipe.

A supporting pipe is known (German Offenlegungsschrift No. 23 60 514 and U.S. Pat. No. 3,998,290) that consists of a single pipe and presents uniform wall thickness. This supporting pipe is almost rigidly connected as an assembly with a rear transmission unit and a forward engine. Use of such a supporting pipe has disadvantageous effects on the whole system because vibrations are produced by the spectrum of excitation of the engine and the transmission that cause vibrations on the whole assembly and thereby cause noise. Flexion and torsion resonances develop especially strongly in this type of construction, so that, as a whole, comfort that could be provided by acoustic and vibration technology is reduced.

The invention concerns the problem of creating a supporting pipe for an engine-transmission assembly of the type in question in which there will be a reduction of vibration and also of noise.

This problem is solved according to a preferred embodiment of the invention in that the supporting pipe is constituted by at least one outer pipe and an inner pipe fitted therein, which are interconnected at one end and are held in position via a friction seat.

It is further provided that there is a layer of elastic vibration-damping material between the respective pipes. According to another embodiment of the invention, the outer pipe is made shorter than the inner pipe and held with one end in the flange that is to be connected to the transmission housing. It is further provided that the inner pipe supports a plurality of outer pipes that are of different lengths and whose common terminal ends are held in the transmission flange. It is further provided according to the invention that the outer pipe is connected with the flange, and on the other hand the pipes have a fixed interconnection only in the region of the transmission flange. The pipes according to various forms of embodiment of the invention can present an equal or a different wall thickness. Also, the supporting pipe can be made in a mixed construction whereby the outer pipe or pipes are of steel and the inner pipe is of a light metal alloy.

The advantages created by the invention include that vibrations are reduced and thereby noise is diminished. Vibration tests on the supporting pipe with incorporated drive have shown that because of the pipes set one inside the other a relatively pronounced reduction of vibrations is produced in the range of bending and torsion oscillation. Pipes with an intermediate layer advantageously produce a supporting pipe that is impermeable to air noise, whereby bearing and transmission noises can be reduced.

This behavior is especially at its most favorable when the pipes present the same wall thickness. This effect is possible because a partial conversion of oscillation energy into heat can occur because of the mechanical friction between the pipes, and the energy conversion has a damping effect on the oscillations. The supplementary fixed interconnection of the pipes in the region of the transmission flange effects a stiffening of the supporting pipe in the flexing direction, because the two pipes are in positive engagement in the region of the transmission, where a relatively high driving moment has to be backed up. By this connection it is further managed that in torsional excitation the pipes maximally rub against each other, so that reduction of vibration is achieved.

For weight reduction, the outer pipes of the supporting pipe can be made shorter or longer, corresponding to the increasing load in the direction of the transmission. Also, there can be a mixed construction of the pipes which may be for example made of aluminum, steel, fiberglass reinforced plastic and CFK.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENT

Figure 1:
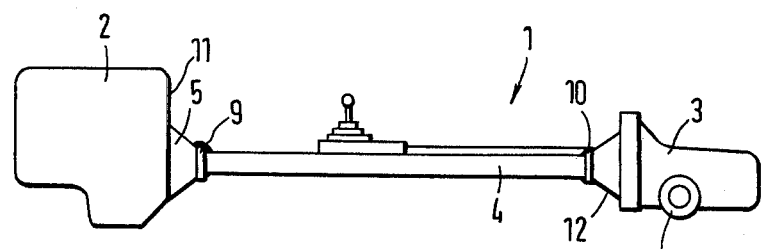
FIG. 1 shows a structural element comprising a supporting pipe, and forward and rear drive unit

FIG. 1 shows a drive unit 1 of a motor vehicle that has an engine 2 at the front and transmission 3 at the rear, whereby the engine is connected with the transmission via a pipe 4 therebetween. In the illustrated embodiment, engine 2 is provided with a clutch 5 and transmission 3 has an axle drive 6.

Supporting pipe 4 comprises at least two pipes, an inner pipe and one or more outer pipes. Pipes 7 and 8 are precisely fitted into each other so that the inner pipe 7 is held in the outer pipe 8 with pressure. Pipes 7 and 8 can be made either by drawing or formed by at least two sheets rolled together. Pipes produced in the drawing process are thrust together and the inner tube is widened by rolls in such a way that the pipes are held in position via a friction seat.

Pipes 7 and 8 respectively are held in flanges 9 and 10 that are connected with the engine housing 11 as well as with the transmission housing 12.

Figure 2:
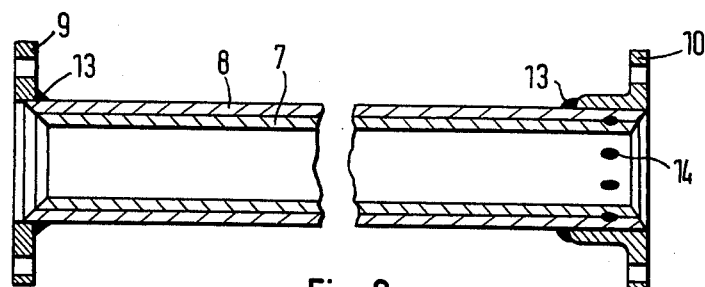
FIG. 2 shows a supporting pipe according to FIG. 1 in section, with connecting flanges

FIG. 2 shows the connection of pipes 7 and 8 with each other and with flanges 9 and 10, in detail. Outer pipe 8 is connected by a weld 13 with flanges 9 and 10. Pipes 7 and 8 are interconnected only in the region of the transmission flange 10, by spot welds, indicated by weld points 14.

Figure 3:
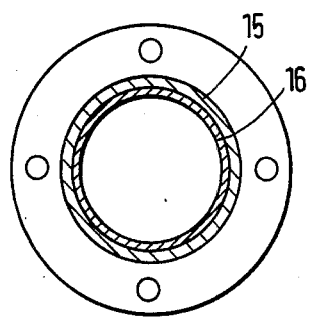
FIG. 3 shows another embodiment of a supporting pipe with different wall thicknesses

Because of the connection of the outer pipe with the inner pipe, the pipes that have been brought together allow mechanical friction between the opposed pipe surfaces when they are under load. Weld points 14 and the fastening of flanges 9 and 10 only on outer pipe 8 have the effect of maximal damping action in bending and torsion stress. In this way oscillation energy is converted to heat, and noise is decomposed and damped. To produce this effect, there are various possible embodiments of supporting pipe 1. Thus, according to FIG. 3 the supporting pipe consists of pipes 15 and 16 which have different wall thickness, inner pipe 16 having the thinner wall. Because of the different wall thicknesses of pipes 15 and 16, they have different oscillation properties directed against each other, promoting a decomposition of vibration.

Figure 4:
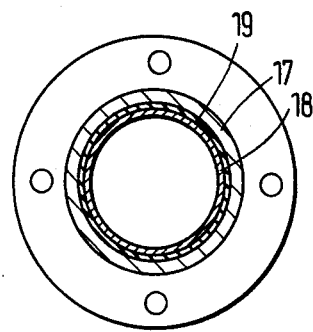
FIG. 4 shows another embodiment with a layer disposed between the pipes.

According to FIG. 4, there is a layer 19 between pipes 17 and 18 made of an elastic vibration-damping material such as butyl rubber, silicone, bayolin or the like. This layer 19 should present a relatively great intrinsic damping so that by deformation of the layer, energy will be converted and thereby vibrations can be reduced.

Figure 5:
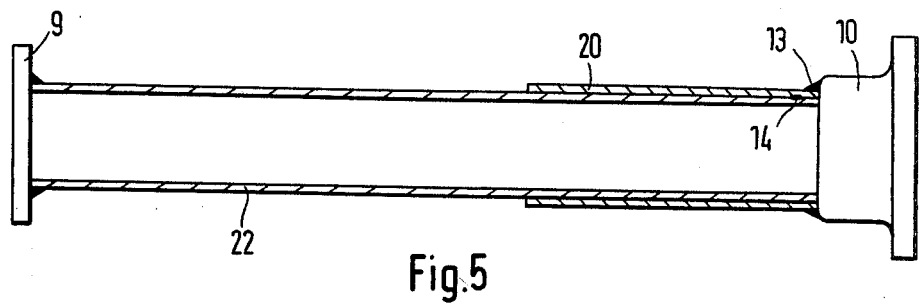
FIGS. 5 and 6 are other forms of embodiment with outer pipes of different length.
Figure 6:
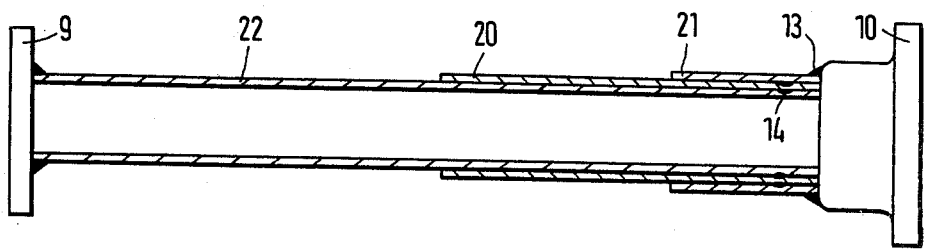

In FIGS. 5 and 6, outer pipe 20 or outer pipes 20, 21 is/are shorter than the inner pipe 22 and only connected with the transmission flange by weld 13. These embodiments, as opposed to embodiments with equal length outer and inner pipes (FIGS. 2 to 4) are lighter in weight. For further weight reduction the supporting pipe can also be made with mixed construction, where one of the pipes can be made of an aluminum alloy for instance and the others of steel.

While we have shown and described various embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

What is claimed is:

1. A drive unit for an automotive vehicle, comprising an engine with a clutch and a transmission unit, the engine being disposed forwardly of the transmission and connected to the transmission to form a unit by an interposed supporting pipe, the supporting pipe comprising at least one outer pipe and an inner pipe fitted therein, said pipes being fixedly interconnected only at one end and except for said one end being held together in a manner permitting relative movement by a friction seating of the inner pipe within the outer pipe.

2. A drive unit as in claim 1, comprising a layer of an elastic vibration-damping material positioned between the inner and outer pipes.

3. A drive unit as in claim 1 or 2, characterized in that the outer pipe is shorter than the inner pipe and is held with one of its ends in a flange that is connected to the transmission housing.

4. A drive unit as in claim 1, characterized in that the inner pipe supports a plurality of outer pipes of different length, one of the ends of the pipes being held in common in the transmission flange.

5. Supporting pipe as in one of the claims 1 or 2 or 4 characterized in that on the one hand only one of the pipes is fixedly connected with the flanges of the engine and transmission and on the other hand the pipes have a fixed mutual interconnection only in the region of the transmission flange.

6. Supporting pipe as in claim 3 characterized in that on the one hand only one of the pipes is fixedly connected with the flanges of the engine and transmission and on the other hand the pipes have a fixed mutual interconnection only in the region of the transmission flange.

7. Supporting pipe as in one of claims 1 or 2 or 4, characterized in that the inner and outer pipes have the same wall thickness.

8. Supporting pipe as in claim 3, characterized in that the inner and outer pipes have the same wall thickness.

9. Supporting pipe as in claim 5, characterized in that the inner and outer pipes have the same wall thickness.

10. Supporting pipe as in one of claims 1 or 2 or 4, characterized in that the inner and outer pipes respectively have different wall thickness.

11. Supporting pipe as in claim 3, characterized in that the inner and outer pipes respectively have different wall thickness.

12. Supporting pipe as in claim 5, characterized in that the inner and outer pipes respectively have different wall thickness.

13. Supporting pipe as in claim 7, characterized in that the wall thickness of the inner pipe is less than that of the outer pipe.

14. Supporting pipe as in claim 11, characterized in that the wall thickness of the inner pipe is less than that of the outer pipe.

15. Supporting pipe as in claim 12, characterized in that the wall thickness of the inner pipe is less than that of the outer pipe.

16. Supporting pipe as in one of claims 1 or 2, characterized in that the outer pipe is of steel and the inner pipe is of a light metal alloy.

17. Supporting pipe as in claim 4, characterized in that the outer pipes are of steel and the inner pipe is of a light metal alloy.

18. Supporting pipe as in claim 5, characterized in that the outer pipes are of steel and the inner pipe is of a light metal alloy.

19. Supporting pipe as in claim 7, characterized in that the outer pipes are of steel and the inner pipe is of a light metal alloy.

20. Supporting pipe as in claim 15, characterized in that the outer pipes are of steel and the inner pipe is of a light metal alloy.

21. A drive unit as in claim 1, wherein to the extent that said pipes are co-extensive in length, said pipes are in contact with each other, said friction seating being formed by the full length of mutually facing surfaces of said pipes, whereby bending and torsion vibrations will be reduced.

22. A drive unit according to claim 1 or 21, wherein said fixed interconnection at one end of said pipes comprises a spot welding arrangement.

* * * * *